(12) United States Patent
Uzaki et al.

(10) Patent No.: US 9,586,627 B2
(45) Date of Patent: Mar. 7, 2017

(54) OFF-ROAD VEHICLE

(71) Applicant: HONDA MOTOR CO., LTD., Minato-ku, Tokyo (JP)

(72) Inventors: Masayuki Uzaki, Niiza (JP); Shinichi Karube, Florence, SC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/067,544

(22) Filed: Mar. 11, 2016

(65) Prior Publication Data

US 2016/0280058 A1   Sep. 29, 2016

(30) Foreign Application Priority Data

Mar. 27, 2015   (JP) .................... 2015-065481

(51) Int. Cl.

| | |
|---|---|
| *B62D 25/14* | (2006.01) |
| *B62D 25/10* | (2006.01) |
| *B62D 25/08* | (2006.01) |
| B62D 23/00 | (2006.01) |
| B62D 25/16 | (2006.01) |

(52) U.S. Cl.
CPC .......... *B62D 25/14* (2013.01); *B62D 25/082* (2013.01); *B62D 23/005* (2013.01); *B62D 25/10* (2013.01); *B62D 25/168* (2013.01)

(58) Field of Classification Search
CPC ...... B62D 25/14; B62D 25/142; B62D 25/08; B62D 25/082; B62D 25/10; B62D 25/16; B62D 25/168; B62D 23/00; B62D 23/005
USPC .................... 180/68.1, 68.2, 68.3, 68.4, 68.5
See application file for complete search history.

(56) References Cited

U.S. PATENT DOCUMENTS

| | | | | |
|---|---|---|---|---|
| 7,819,220 B2 * | 10/2010 | Sunsdahl | ............ | B62D 21/183 180/312 |
| 9,452,789 B2 * | 9/2016 | Karube | ................ | B62D 25/12 |
| 2008/0289896 A1 | 11/2008 | Kosuge et al. | | |

* cited by examiner

*Primary Examiner* — John Walters
(74) *Attorney, Agent, or Firm* — Honda Patents & Technologies North America, LLC; William R. Fisher

(57) ABSTRACT

An off-road vehicle is provided with a front-side housing that has a rear end that defines a gap with an upper end of a front-floor cover that is spanned by a flexible member that is a separate component from the front-side housing and the front-floor cover.

20 Claims, 8 Drawing Sheets

OFF-ROAD VEHICLE

CROSS REFERENCES TO RELATED APPLICATIONS

The present application claims priority under 35 U.S.C. §119 to Japanese Patent Application No. 2015-065481, filed Mar. 27, 2015, entitled "Off-Road Vehicle," the contents of which are incorporated herein by reference in their entirety.

BACKGROUND

Conventional off-road vehicles are not configured to suppress hot air from the radiator from entering areas of the vehicle such as the passenger compartment in a way that improves the assembly process for the vehicle.

SUMMARY

In accordance with one embodiment, an off-road vehicle is provided with a front-side housing under a front hood wherein an upper front end of an instrument panel is provided in front of a passenger compartment and is continuous with a rear end of the front hood.

In accordance with one embodiment, an off-road vehicle is provided that can improve assembly properties and can suppress radiator exhaust air from being taken up into a housing under a front hood and an instrument panel and can suppress water, mud, and the like from being splashed up.

In accordance with one embodiment, an off-road vehicle is provided with a front-side housing that is positioned between front fender portions on the left and right, is covered by a front hood, and houses one or more electrical components, such as a battery, and the like. An instrument panel is included that is provided with a first surface that is disposed above a front portion of a passenger compartment, a second surface that extends forward and diagonally downward from an upper end of the first surface and is continuous with respective rear ends of the front fender portions on the left and right and the front hood, and a third surface that extends forward and diagonally downward from a lower end of the first surface and is continuous with an upper end of a front-floor cover that is raised upward from a front floor of the passenger compartment. An instrument panel frame is included that extends in a vehicle-width direction forward of the first surface of the instrument panel and respectively supports left and right end portions of the instrument panel, a steering column, and a rear end portion of the front-side housing. The front-side housing has at the rear end a support portion that is supported by the instrument panel, and the rear end of the front-side housing and the upper end of the front-floor cover define an opening that is substantially blocked by a member. The member may be a separate component from the front-side housing and the front-floor cover.

A radiator may be disposed in a vehicle front end portion and a front end of the front-side housing may be extended to an upper side of the radiator.

Optionally, the member is a mudguard that may be manufactured by cutting out a slab or sheet of an elastic material such as rubber.

Optionally, the front-side housing may be integrally formed with the front fender portions on the left and right and the member may be provided with a width thereof in the vehicle-width direction substantially matching a width of the front-side housing.

Optionally, a control lever that penetrates a through hole provided in the first surface may be provided to the instrument panel and a rubber plate may be provided in front of the through hole.

In accordance with one embodiment, a front-side housing has at a rear end a support portion that is supported by the instrument panel, and a gap is defined by the rear end of the front-side housing and the upper end of the front-floor cover. The gap is substantially blocked by a member that is a separate component from the front-side housing and the front-floor cover. Therefore, an inside of the front-side housing and of the instrument panel can be partitioned from a space below the front-side housing by the member to inhibit exhaust air of the radiator from being taken up and/or water, mud, and the like from being splashed up. Moreover, the member may be a separate component (non-integral) from the front-side housing. It is also to be understood that the member may be a separate component (non-integral) from the front-floor cover. Therefore, assembly properties can be improved.

In accordance with one embodiment, the radiator is disposed in the vehicle front end portion, and the front end of the front-side housing is extended to the upper side of the radiator. Therefore, even if exhaust air that is passed through the radiator attempts to flow upward, it is guided below the front-side housing and by the member and the front-floor cover to be exhausted below the vehicle body. Therefore, the exhaust air of the radiator can be made less likely to flow above the front-side housing and into the instrument panel.

Optionally, the member is manufactured by cutting a slab or sheet of elastic material such as rubber; therefore, there is no need to mold the member with a mold or the like, and manufacture is facilitated. The member is positioned on an inner side of the instrument panel in a location that is dense with cables, harnesses, and the like. Therefore, the flexibility of the elastic member makes it easy to assemble and can be positioned so as to not interfere with other components.

Optionally, the front-side housing is integrally formed with the front fender portions on the left and right, and the member is provided with the width thereof in the vehicle-width direction substantially matching the width of the front-side housing. Therefore, because the front fender portions on the left and right are continuous with a front end of the instrument panel, the width in the vehicle-width direction of the member is sufficient if substantially matching the width of the front-side housing.

Optionally, a control lever that penetrates the through hole provided in the first surface is provided to the instrument panel, and a rubber plate is provided in front of the through hole. Therefore, because excess items inside the instrument panel can be hidden by the rubber plate, an appearance can be improved. Moreover, hot air of the radiator exhaust air, splashing up of water, mud, and the like can be further suppressed by the rubber plate.

DETAILED DESCRIPTION

An embodiment of the present disclosure is described below with reference to the drawings. Note that in the description, descriptions of directions such as front and rear, left and right, and up and down are identical to directions relative to a vehicle body if no particular description is given. Moreover, the reference sign FR illustrated in each diagram indicates a vehicle body front, the reference sign UP indicates a vehicle body top, and the reference sign LH indicates a vehicle body left.

Figure 1:
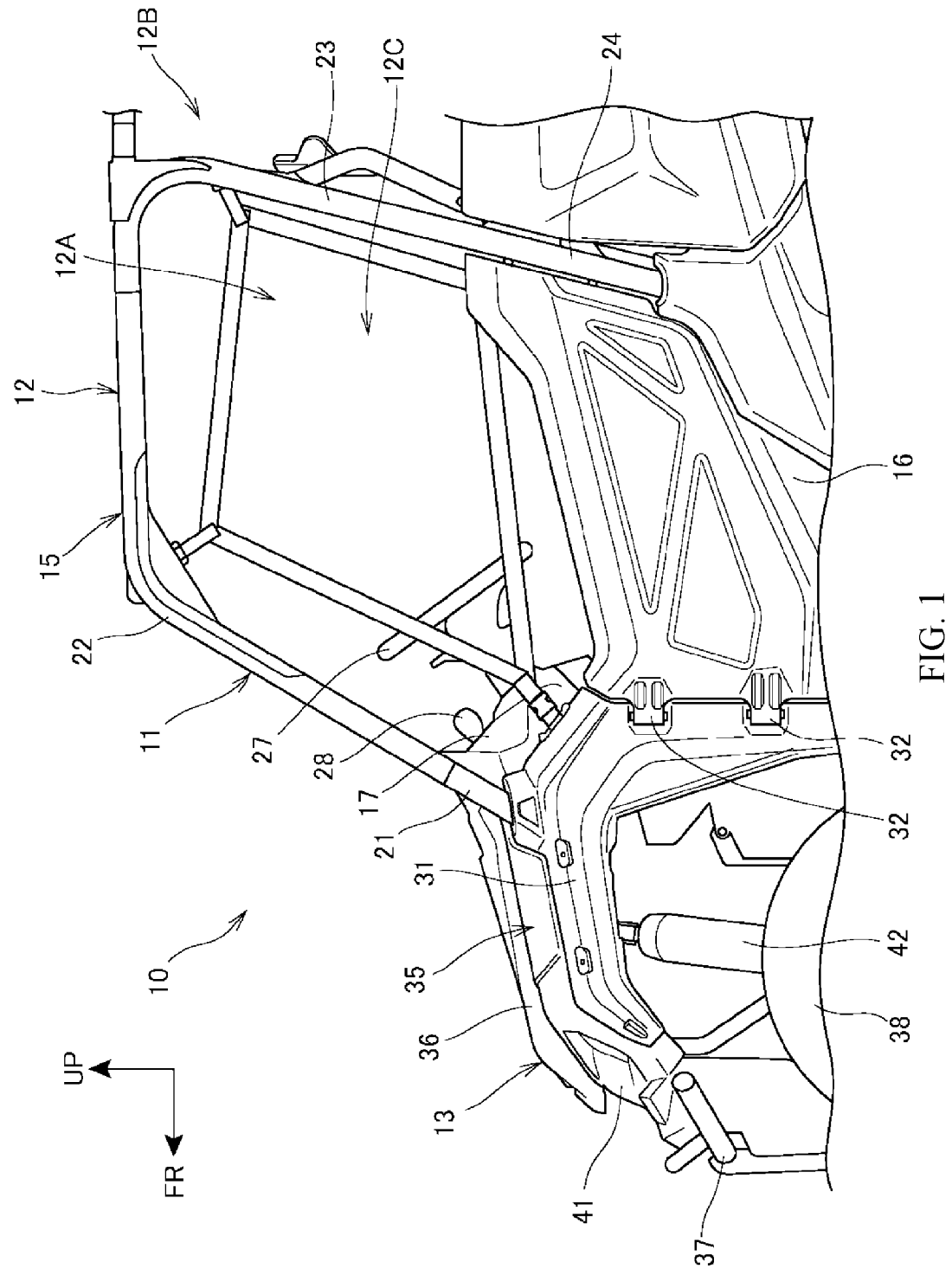
FIG. 1 is a left view of a front upper portion of an off-road vehicle according to the present disclosure.

FIG. 1 is a left view of a front upper portion of an off-road vehicle 10 according to the present disclosure.

The off-road vehicle 10 (indicated hereinbelow as "vehicle 10") is a four-wheel vehicle that is provided with a front seat and a rear seat. The vehicle 10 may be an MUV (multi-utility vehicle) of a so-called side-by-side type where, for example, three persons ride lined up horizontally in the front seat.

The vehicle 10 includes a body 11 with a cabin 12 in which the passengers ride and the like. A front body 13 is provided forward of the cabin 12.

The cabin 12 is provided with a roll bar 15 that is assembled on an upper portion of a vehicle body frame (not illustrated). A pair of doors 16, left and right, and an instrument panel 17 are provided toward the front of the cabin 12. As shown, the cabin 12 includes a front cabin 12A in which the front seat is provided, a rear cabin 12B in which the rear seat is provided, and a passenger compartment 12C.

The roll bar 15 is provided with front roll bars 21, front upper roll bars 22, center upper roll bars 23, and center side roll bars 24 respectively on the left and right. The front roll bars 21 configure a front lower portion of the roll bar 15. The front upper roll bars 22 extend upward and diagonally rearward from upper ends of the front roll bars 21 and further extend rearward. The center upper roll bars 23 are portions extending downward from rear ends of the front upper roll bars 22 and are disposed on vehicle-width-direction outer sides between the front cabin 12A and the rear cabin 12B. The center side roll bars 24 extend downward from lower ends of the center upper roll bars 23.

The doors 16 are installed to rear edge portions of a pair of outer fenders 31, left and right, configuring the front body 13 so as to be able to open and close via a pair of upper and lower hinges 32.

The instrument panel 17 is provided at the forward end of the passenger compartment 12C, and a steering wheel 27 and a shift lever 28 protrude into the passenger compartment 12C from through holes provided in the instrument panel 17.

The front body 13 is provided with front fenders 35, a front hood 36, and a front bumper 37.

The front fenders 35 cover front wheels 38 from above. The outer fenders 31 configure side portions of the front fenders 35. The front hood 36 is installed in a central portion of the front fenders 35 to be able to open and close and be attached and detached. The front bumper 37 is provided in front of the front fenders 35. A pair of headlights 41, left and right, may be provided in the front end portions of the front fenders 35. Front cushion units 42 may be provided as buffers for configuring a front suspension that suspends the front wheels 38.

Figure 2:
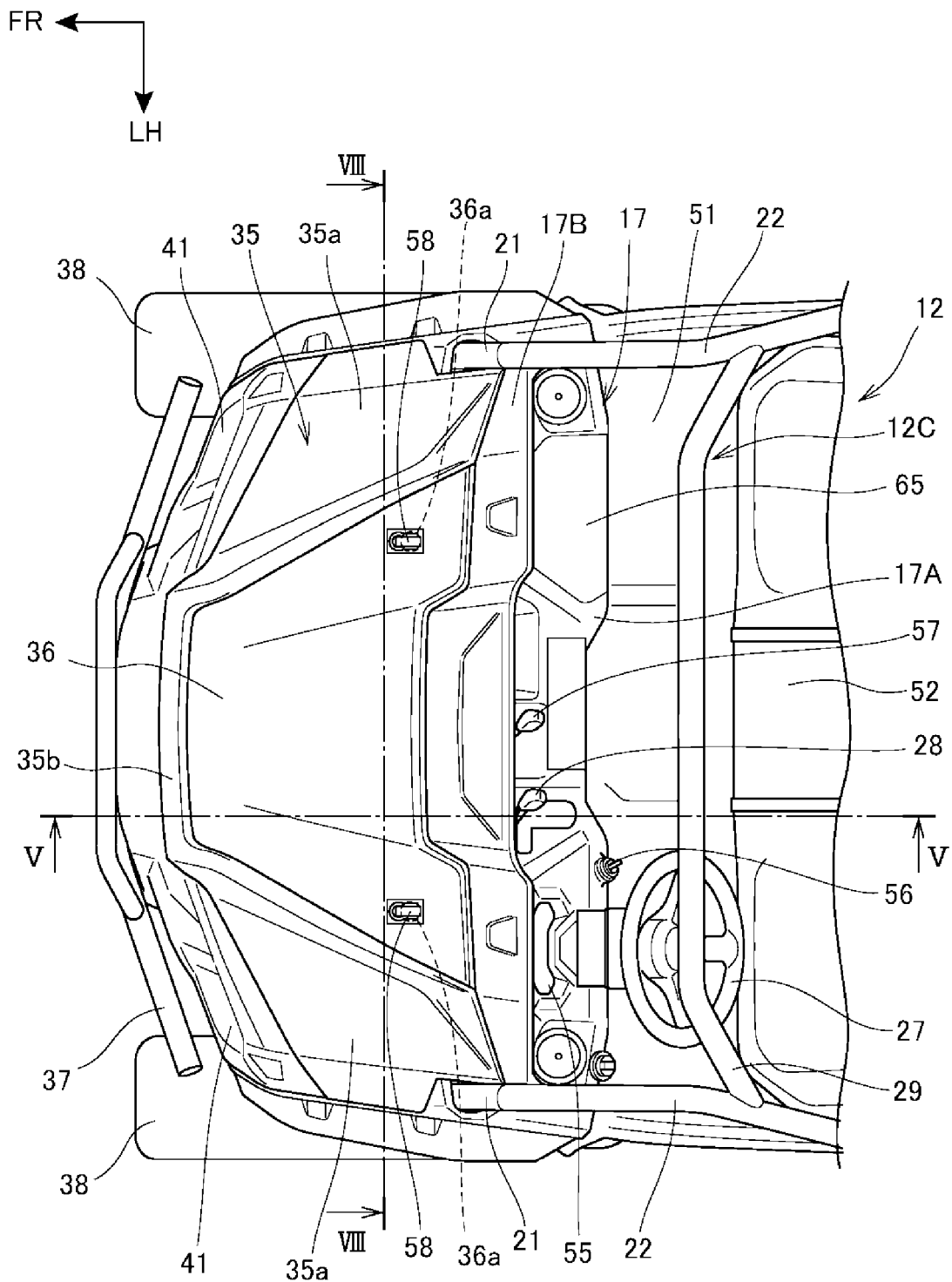
FIG. 2 is a plan view illustrating the front portion of the vehicle.
Figure 3:
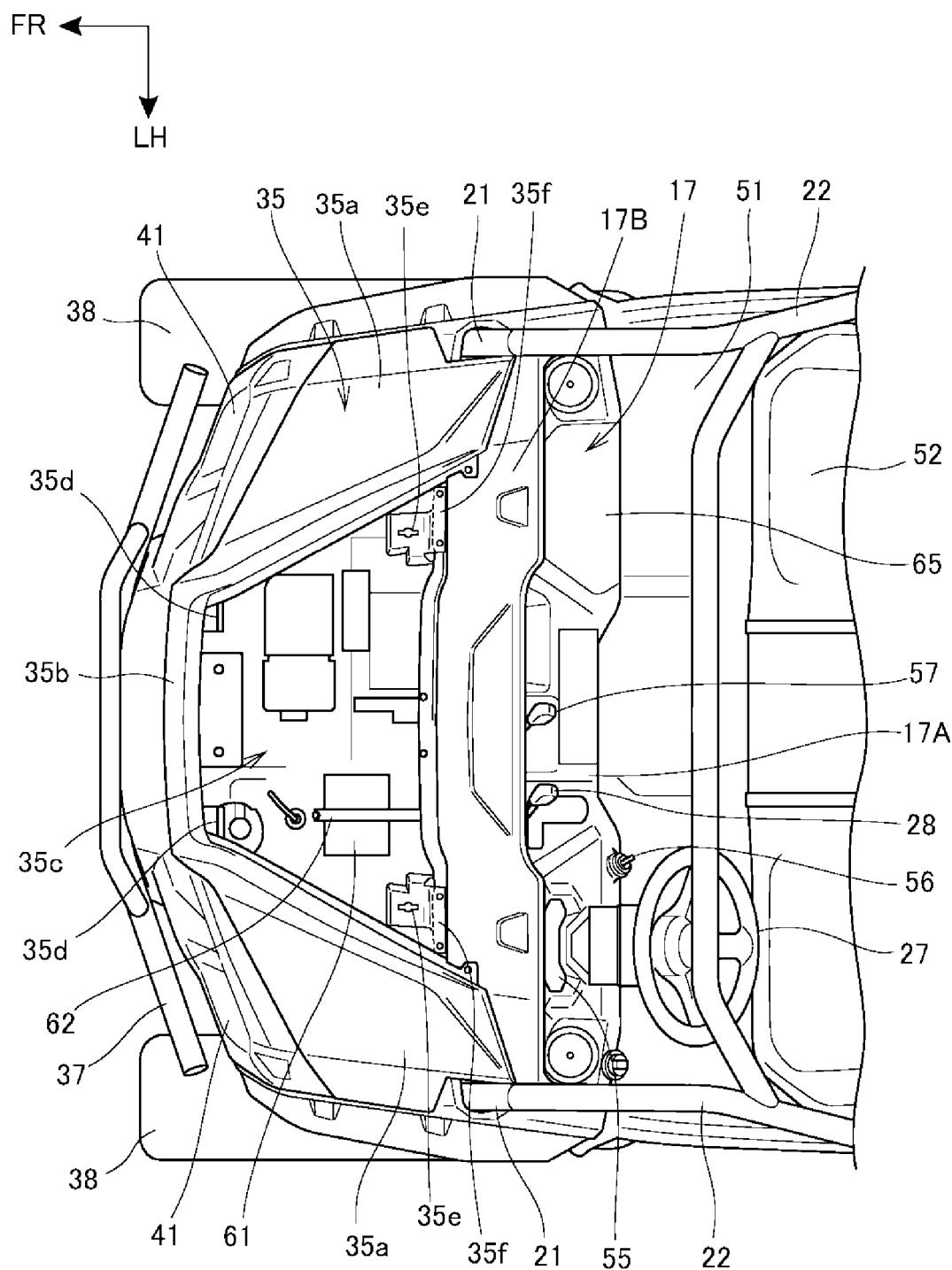
FIG. 3 is a plan view illustrating the front portion of the vehicle of FIG. 2 with a front hood removed.

FIG. 2 is a plan view illustrating a front portion of the vehicle 10. FIG. 3 is the same plan view as FIG. 2 with the front hood 36 removed.

As illustrated in FIG. 2, the cabin 12 is provided with a front floor 51 that forms a bottom portion thereof and a front seat 52 positioned on the front floor 51 that extends in the vehicle-width direction.

Figure 5:
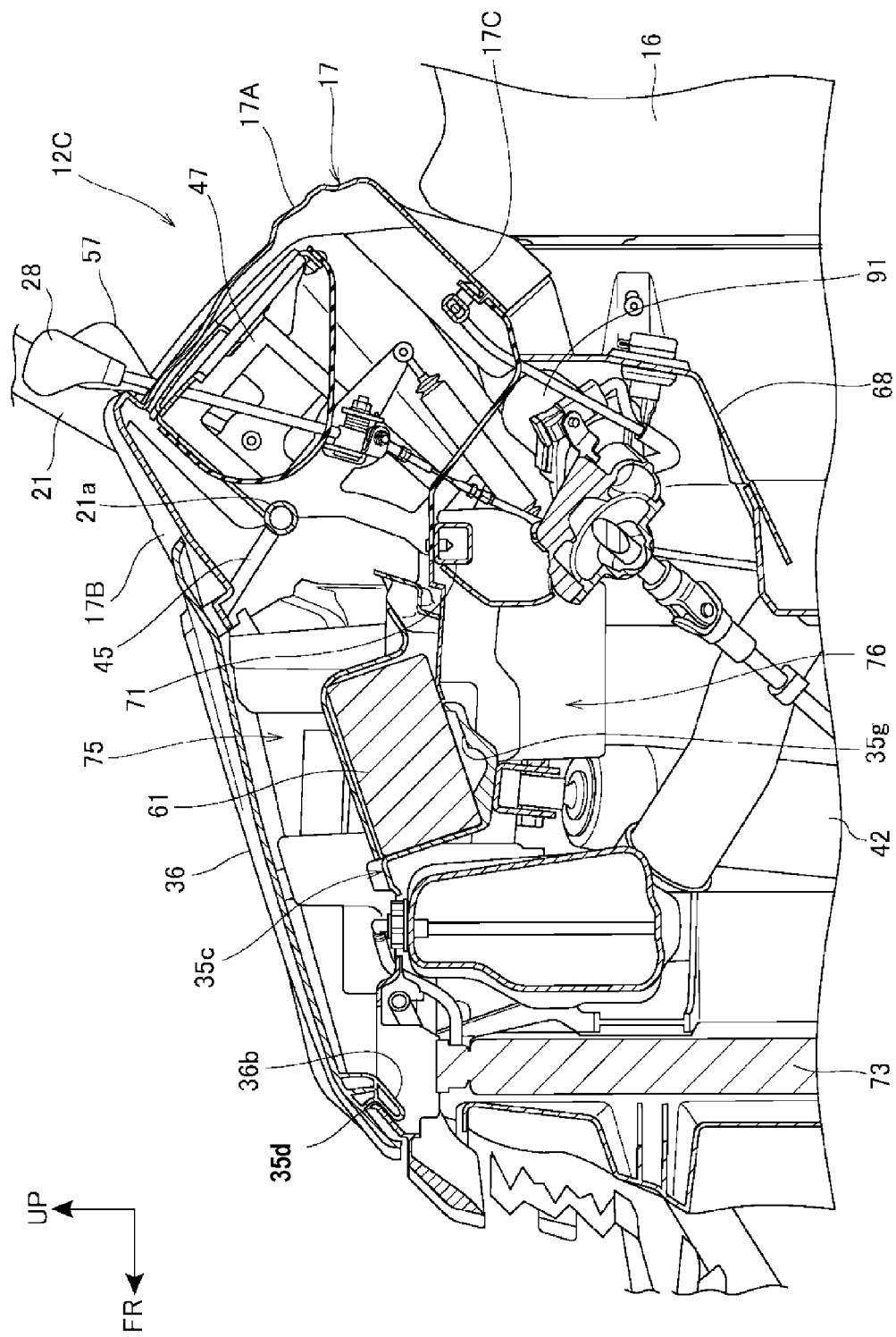
FIG. 5 is a line V-V cross-sectional view of FIG. 2.
Figure 6:
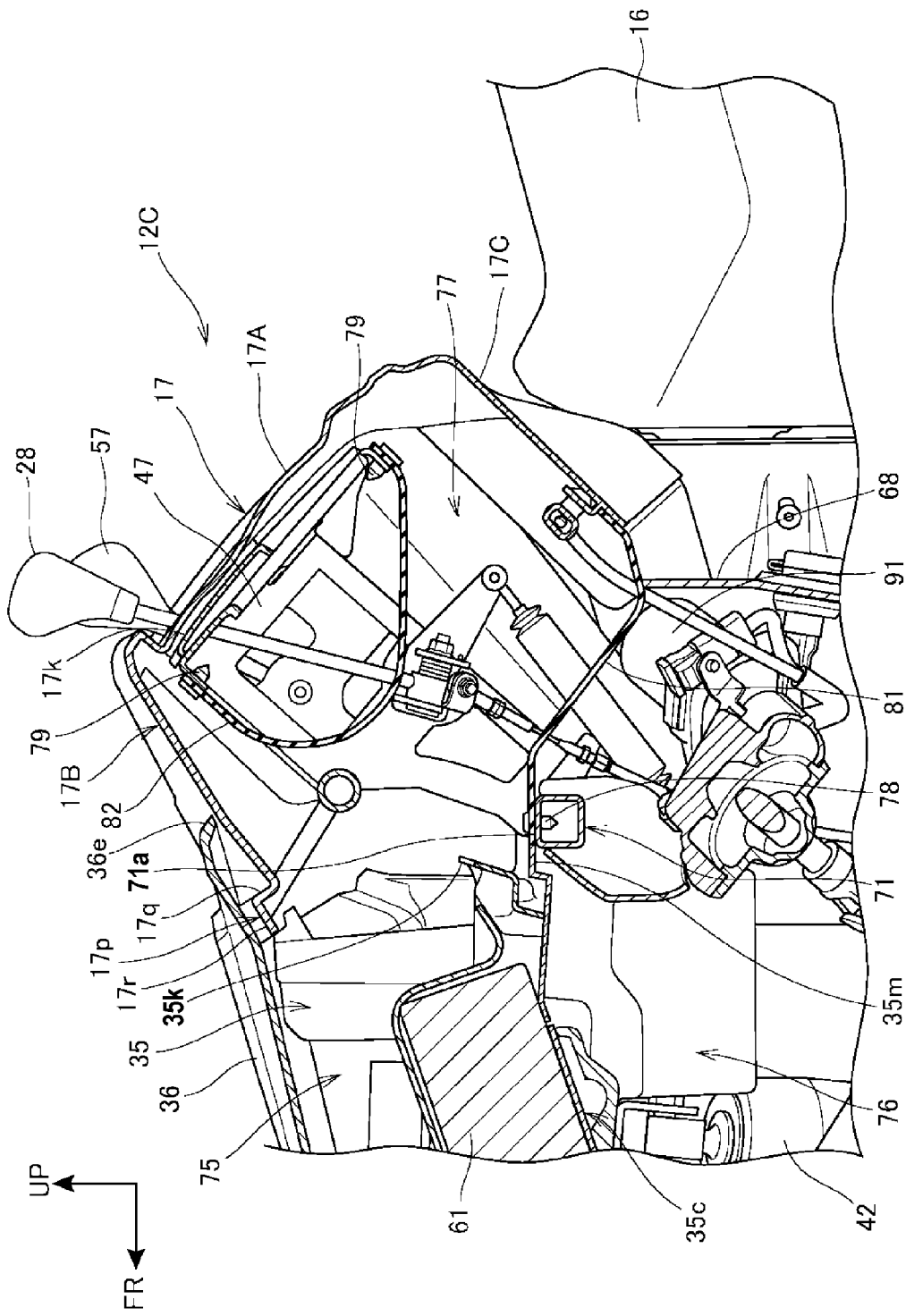
FIG. 6 is a partial enlarged view of FIG. 5.

A first partition is provided that is positioned between the front body 13 and the passenger compartment 12C. The first partition includes the instrument panel 17. As best shown in FIGS. 5 and 6, the instrument panel 17 is provided with a first surface 17A, or control panel, facing the passenger compartment 12C and a second surface 17B that extends from an upper end portion of the first surface 17A toward the front-fenders 35 and the hood 36 of the front body 13.

Figure 4:
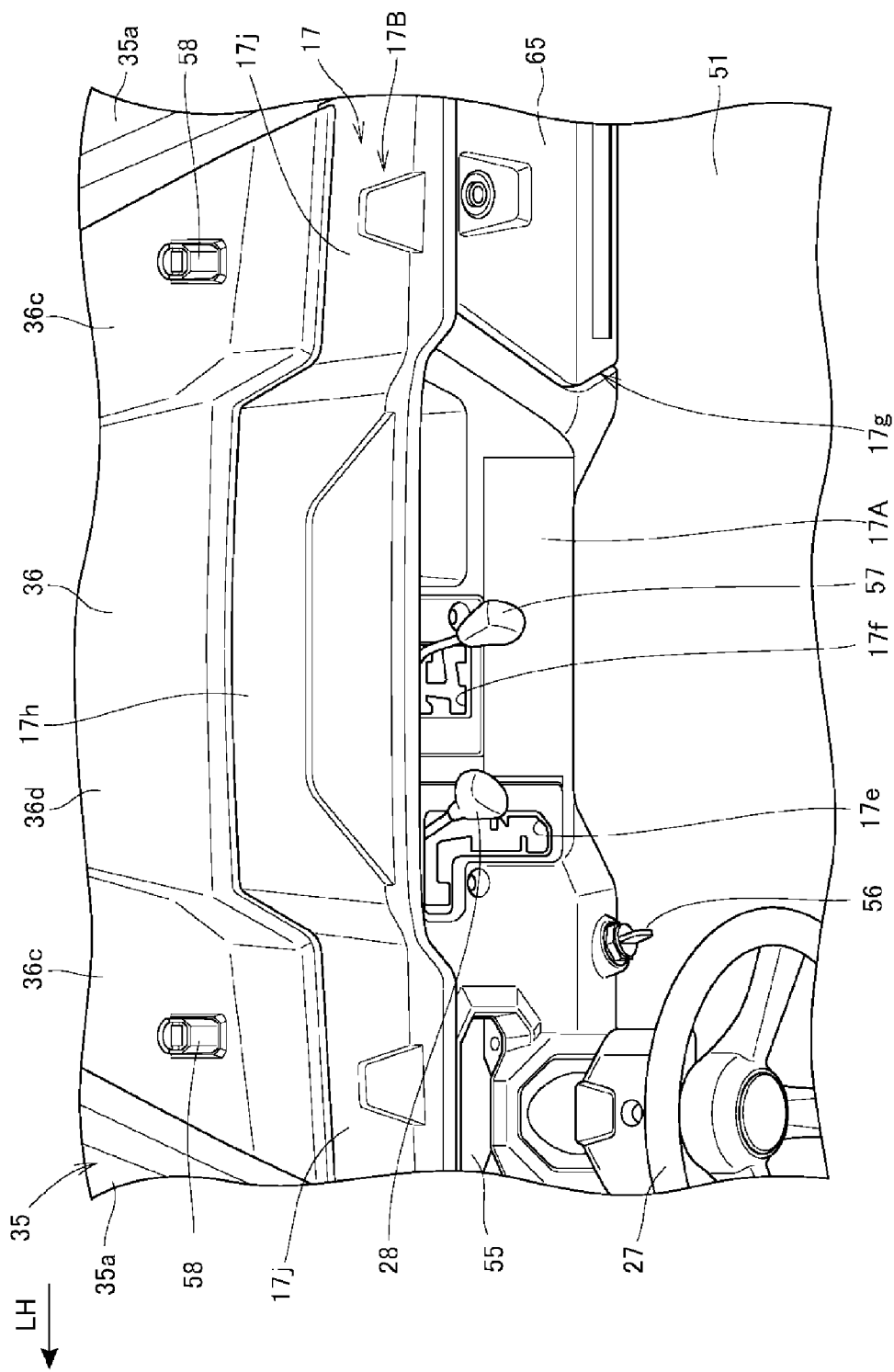
FIG. 4 is a partial enlarged view of FIG. 2.

As shown in FIG. 4, the first surface 17A is provided with a meter panel 55 disposed in front of the steering wheel 27 and an ignition switch 56 disposed in a right-side vicinity of the steering wheel 27. Moreover, the shift lever 28 and a drive mode switching lever 57 protrude from the first surface 17A into the passenger compartment 12C.

In the plan view, the shift lever 28 is disposed in the right-side vicinity of the steering wheel 27, and the drive mode switching lever 57 that switches between four-wheel drive and two-wheel drive is disposed in a vehicle-width-direction central portion of the instrument panel 17.

As shown in FIG. 2, the front fenders 35 are provided with a pair of fender portions 35a, 35a, left and right, and a front end portion 35b that integrally connects respective front ends of the fender portion 35a, 35a on the left and right.

The front hood 36 is disposed between the fender portions 35a, 35a on the left and right. As shown in FIG. 5, claw portions 36b may be provided on the front hood 36. The claw portions 36b may be received in latching holes 35d provided in the front end portion 35b of the fender 35. As shown in FIG. 2, buckle insertion holes 36a, 36a through which buckles 58 as fasteners for fixing to the front fenders 35 are passed through are provided in rear portions, left and right, of the front hood 36. An upper cross roll bar 29 connects the front upper roll bars 22, 22 on the left and right.

As illustrated in FIG. 3, a second partition is provided that includes a front-side housing 35c that extends between the fender portions 35a, 35a on the left and right, and behind the front end portion 35b. In a non-limiting example, the front-side housing 35c may be formed integrally as a single piece with the fender portions 35a on the left and right and the front end portion 35b.

Figure 8:
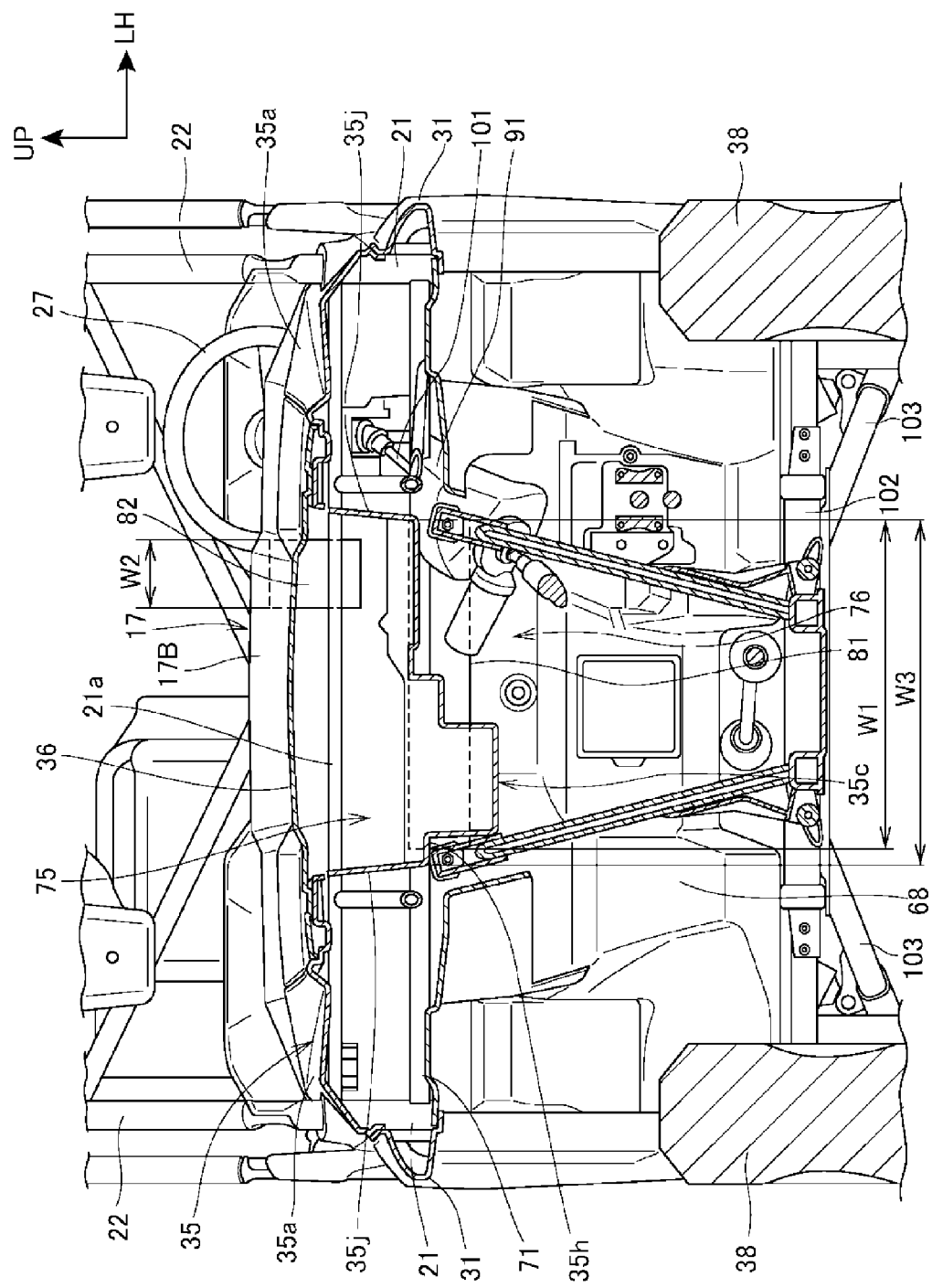
FIG. 8 is a line VIII-VIII cross-sectional view of FIG. 2.

As shown in FIGS. 3 and 8, the front-side housing 35c is recessed downward relative to the fender portions 35a, 35a on the left and right and the front end portion 35b. As shown in FIG. 3, the front-side housing 35c may house electrical components such as a battery 61 and auxiliary components. As also shown in FIG. 3, the front-side housing 35c may provide access to the top of components positioned below the front-side housing 35c, such as the radiator 73. A clamp 62 may be provided that fixes the battery 61 by pressing it from above.

The latching holes 35d, 35d, left and right, into which the pair of claw portions 36b, 36b, left and right, provided on the lower front end of the front hood 36 (see FIG. 2) are respectively latched are provided at the front end on the left and right of the front-side housing 35c. As shown in FIG. 3, a pair of buckle latching holes 35e, 35e, left and right, into which tip portions of the buckles 58 (see FIG. 2) are inserted and latched are provided on the left and right upper portions of the rear end of the front-side housing 35c. Also provided on the upper portions of the rear end of the front-side housing 35c rearward of the latching holes 35e, 35e, are flanges or support portions 35f, 35f that are installed on the left and right of the forward end of the second surface 17B of the instrument panel 17.

As shown in FIG. 4, the first surface 17A of the instrument panel 17 may include the meter panel 55, a shift hole 17e through which the shift lever 28 penetrates, a mode switching hole 17f through which the drive mode switching lever 57 penetrates, and an instrument panel housing portion 17g that houses small articles. A lid 65 may be provided to cover an opening of the instrument panel housing portion 17g so as to be able to open and close.

As shown in FIG. 4, the second surface 17B is provided with side portions 17j, 17j on the left and right positioned in front of the steering wheel 27 and above the instrument panel housing portion 17g. A central portion 17h is formed higher than the side portions 17j, 17j and is positioned between the side portions 17j, 17j.

The front hood 36 is provided with hood side portions 36c, 36c on the left and right and a hood central portion 36d that bulges upward integrally from the hood side portions 36c, 36c.

The hood side portions 36c, 36c are fixed by the buckles 58, and overlap the side portions 17j, 17j on the left and right of the instrument panel 17. The hood central portion 36d overlaps the central portion 17h of the instrument panel 17.

FIG. 5 is a line V-V cross-sectional view of FIG. 2. As shown in FIG. 5, the instrument panel 17 is provided with a third surface 17C that extends forward and diagonally downward from a lower end of the first surface 17A.

An upper end portion of a front-floor cover 68 is raised from the front floor 51 (see FIGS. 2 and 5) and is connected to a lower end portion of the third surface 17C. Accordingly, the upper end portion of the front-floor cover 68 may form part of the first partition with the instrument panel 17.

A cross frame 71 of a rectangular cross section connects the front roll bars 21 on the left and right and extends in the vehicle-width direction below the second surface 17B and forward of the third surface 17C of the instrument panel 17. A steering column 91 that supports a steering shaft 101 extending from the steering wheel 27 so as to be able to rotate is installed to the cross frame 71. An upper cross frame 21a of a circular cross section bridges the front roll bars 21 on the left and right and passes above the cross frame 71. As shown in FIG. 5, a pair of inclined frames 45, left and right, extend forwardly and upwardly from the upper cross frame 21a to support a front end of the second surface 17B of the instrument panel 17.

A lever support member 47 is positioned on an inner side of the instrument panel 17 and is fixed to the upper cross frame 21a and the cross frame 71 to support the shift lever 28 so that the shift lever 28 is able to swing.

The front-side housing 35c is covered from above by the front hood 36. A front end of the front-side housing 35c is disposed in an upper vicinity of a radiator 73 that is positioned below the front end of the front hood 36. A rear end of the front hood 36 is disposed above the cross frame 71. Accordingly, the front-side housing 35c may extend from the front end portion 35b to the cross frame 71. An under-hood space, or first compartment, 75 is provided between the front-side housing 35c and the front hood 36. An under-housing space, or second compartment, 76 is formed below that front-side housing 35c.

For example, by providing the front end of the front-side housing 35c in the upper vicinity of the radiator 73, exhaust air that flows from in front of the radiator 73, through the radiator 73, and to the rear of the radiator 73 can be made to flow in a space below the front floor 51 from the under-housing space 76 below the front-side housing 35c. As a result, the exhaust air of the radiator 73 can be inhibited from flowing in the under-hood space 75.

The battery 61 is housed in a concave portion 35g formed in a rear portion of the front-side housing 35c with a front of the battery 61 lowered so an upper surface thereof substantially aligns with the front hood 36 (as shown in FIG. 5).

The hook-shaped claws 36b, left and right, are integrally formed with the front hood 36 on a lower surface of the front end portion thereof. The claws 36b are in a state of being inserted and latched in the pair of latching holes 35d, left and right, provided in the front end portions of the front fenders 35. A rear end of the front hood 36 overlaps the front end of the second surface 17B of the instrument panel 17.

FIG. 6 is a partial enlarged view of FIG. 5. As shown in FIG. 6, a step 17p is integrally formed with a tip of the second surface 17B of the instrument panel 17. The step 17p extends in the vehicle-width direction and includes a vertical wall 17q that has a front end raised and an inclined wall 17r that is inclined with its front lowered from an upper edge of the vertical wall 17q. The step 17p is covered from above by the rear end of the front hood 36, and a bent portion 36e is formed on a rear edge of the front hood 36 so as to bend downward toward the second surface 17B.

In this manner, by providing the step 17p to the second surface 17B and the bent portion 36e to the front hood 36, rain water and the like can be suppressed from intruding the under-hood space 75 and an instrument panel space 77 (that may form part of the under-hood space 75) from between the second surface 17B and the rear end portion of the front hood 36. Rain water that flows downward over the second surface 17B stops at the step 17p and is less likely to enter the under-hood space 75 and the instrument panel space 77.

As shown in FIG. 6, a vehicle-width-direction central portion 35k at the rear end of the front-side housing 35c is disposed near and above the cross frame 71, and vehicle-width direction side portions 35m positioned on both sides of the vehicle-width-direction central portion 35k at the rear end of the front-side housing 35c are fixed by fixing members (not illustrated) to an upper surface 71a of the cross frame 71. The vehicle-width-direction side portions 35m are disposed inward in a vehicle-width-direction of the flanges 35f shown in FIG. 3.

The front-side housing 35c of the second partition defines a gap with the first partition. The second partition includes a member 81 that spans the gap. For example, the front end of the member 81 may be fixed directly or indirectly to the cross frame 71, and the rear end of the member 81 may be fixed to either the upper portion of the front-floor cover 68 or the third surface 17C of the instrument panel 17. In an illustrative example, the front end of the member 81 may overlap a portion of the front-side housing 35c that is secured to the cross member 71. The member 81 may be composed of a different material than the front-side housing 35c, the front-floor cover 68, or both the front-floor housing 35c and the front-floor cover 68. In an illustrative example, the member 81 is a mudguard that is comprised of a flexible sheet of rubber. Accordingly, the member 81 partitions the under-housing space 76 and the instrument panel space 77 from the under-hood space 75.

Figure 7:
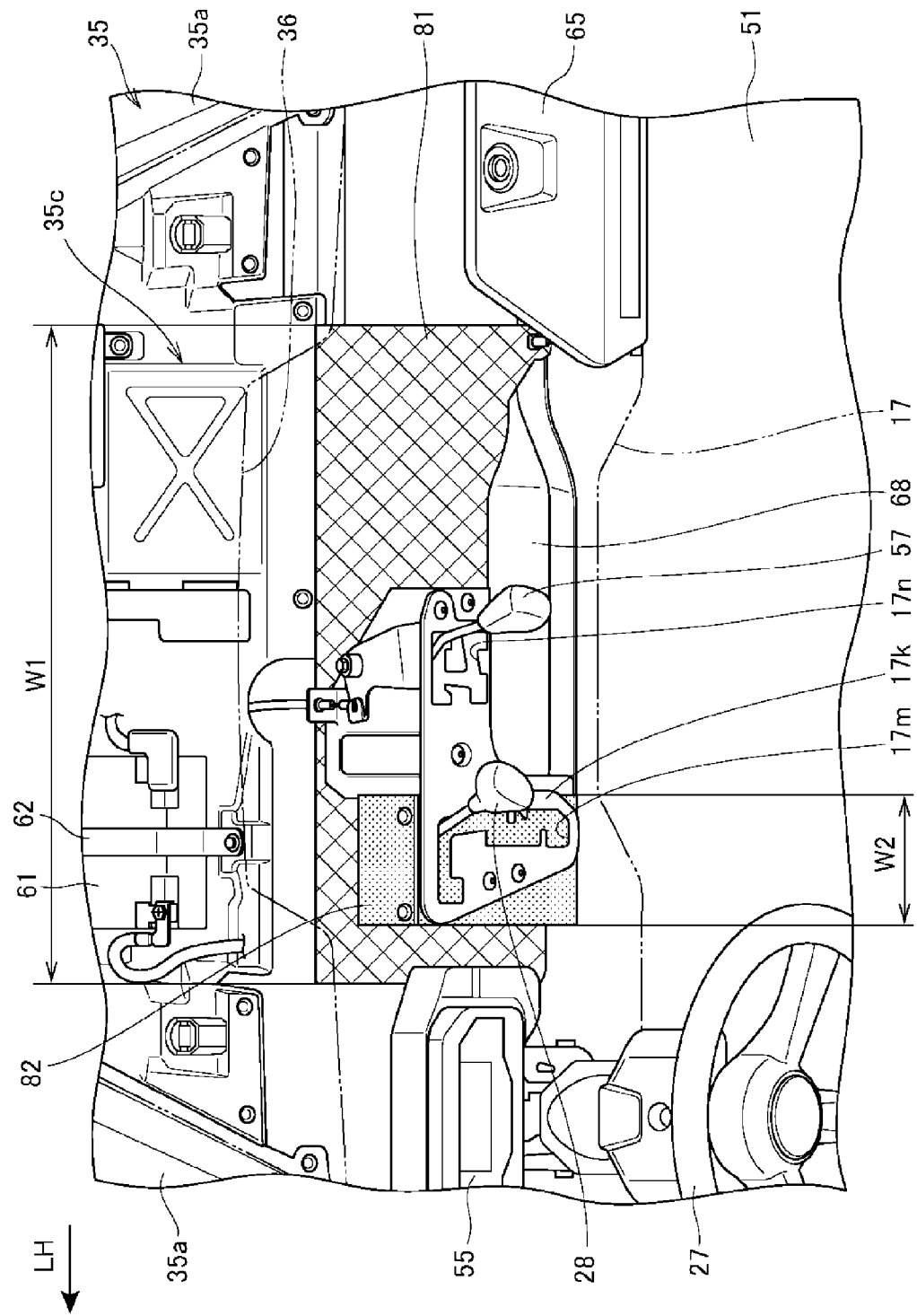
FIG. 7 is a plan view illustrating a state where an instrument panel and the front hood are removed from FIG. 4.

As shown in FIG. 6, the front end of the member 81 is fixed by a plurality of fixing members 78 to the upper surface 71a of the cross frame 71 and may be overlapped with the rear end of the front-side housing 35c. That is, the front end of the member 81 is connected to the rear end of the front-side housing 35c. As shown in FIG. 7, the rear end of the member 81 may be fixed by a plurality of fixing members (not illustrated) to the upper end portion of the front-floor cover 68 that forms part of the first partition.

The member 81 substantially fills the gap between the front-side housing 35c and the first partition to inhibit water, mud, and dust scattered from the under-housing space 76 and the exhaust air of the radiator 73 (see FIG. 5) from entering the instrument panel space 77 and the under-hood space 75.

As shown in FIGS. 6 and 7, an inner panel 17k of the instrument panel 17 is disposed in front of the first surface 17A of the instrument panel 17. As shown in FIG. 6, an auxiliary wall 82 may be provided that curves so as to be convex in a forward and diagonally-downward manner and may be fixed by a plurality of fixing members 79 to an upper end and a lower end of the inner panel 17k.

The auxiliary wall 82 is a plate made of an elastomeric material such as rubber that can be easily bent so as to not interfere with components disposed on the inner side of the instrument panel 17. The auxiliary wall 82 may be provided with a hole for passing components such as the shift lever 28 from the passenger compartment 12C to the instrument panel space 77 of the under-hood space 75.

The auxiliary wall 82 is positioned to, for example, inhibit water, mud, exhaust air of the radiator 73, and dust from entering the passenger compartment 12C through openings such as the shift hole 17e (see FIG. 4) of the first surface 17A of the instrument panel 17 and a shift hole 17m formed in the inner panel 17k.

FIG. 7 is a plan view illustrating a state where the instrument panel 17 and the front hood 36 are removed from FIG. 4. As shown in FIG. 7, the member 81 (a visible portion of the member 81 is drawn cross-hatched) has a rectangular outline, has a width of W1 in the vehicle-width direction, has a left end disposed more on the vehicle-width-direction inner side than a right end of the meter panel 55, and has a right end disposed so as to overlap a left end portion of the lid 65. In other words, the width W1 of the member 81 substantially matches a width in the vehicle-width direction of the central portion 17h of the second surface 17B (see FIG. 4) of the instrument panel 17.

Furthermore, the auxiliary wall 82 (a visible portion of the auxiliary partition wall 82 is drawn dotted) has a rectangular outline, has a width W2 in the vehicle-width direction, and includes a through hole (not illustrated) through which the shift lever 28 is passed.

The shift hole 17m that the shift lever 28 penetrates is formed in a left portion of the inner panel 17k, and the mode switching hole 17n that the drive mode switching lever 57 penetrates is formed in the right portion of the inner panel 17k. The auxiliary wall 82 is disposed behind the shift hole 17m.

FIG. 8 is a line VIII-VIII cross-sectional view of FIG. 2. As shown in FIG. 8, the upper cross frame 21a and the cross frame 71 extend in the vehicle-width direction and bridge the front roll bars 21, 21 on the left and right.

Furthermore, right and left ends of the front fenders 35—specifically, both end portions of the fender portions 35a, 35a on the left and right and the outer fenders 31, 31 on the left and right are fixed to the front roll bars 21, 21 on the left and right. Both end portions of the instrument panel 17 and an upper portion of the steering column 91 are fixed to the cross frame 71.

As shown in FIG. 8, the front-side housing 35c is recessed downward from the fender portions 35a, 35a on the left and right. The front-side housing 35c is provided with a bottom wall 35h formed with a plurality of concavities and convexities so as to accommodate a plurality of housed objects. The front-side housing 35c may include side walls 35j, 35j raised from outer edge portions in the vehicle-width direction of the bottom wall 35h and connected to inner edge portions in the vehicle-width direction of the fender portions 35a, 35a on the left and right.

As shown in FIG. 8, the width W1 of the member 81 may substantially match a width W3 in the vehicle-width direction of the bottom wall 35h of the front-side housing 35c. In this manner, by substantially matching the width W1 member 81 to the width W3 of the front-side housing 35c, the exhaust air of the radiator 73 that flows in the under-housing space 76 below the front-side housing 35c and water, mud, and the like that is scattered from below the front-side housing 35c can be inhibited from entering the under-hood space 75 by the member 81.

In a front view as shown in FIG. 8, the auxiliary wall 82 is provided above the member 81 and so as to be positioned at about the same height as the upper cross frame 21a.

As also shown in FIG. 8, the steering shaft 101 is linked to the steering wheel 27 and supported by the steering column 91 so as to be able to rotate, a steering gearbox 102 of a rack-and-pinion type is linked to a tip portion of the steering shaft 101, and suspension arms 103 are supported on the vehicle body frame so as to be able to swing for supporting the front wheels 38.

As illustrated in FIGS. 2, 3, 5, and 6, the front-side housing 35c is positioned between the fender portions 35a, is covered by the front hood 36, and houses the battery 61 and other electrical components. The instrument panel 17 is provided with the first surface 17A that is disposed above the front portion of the passenger compartment 12C and opposes the passengers, the second surface 17B that extends forward and diagonally downward from the upper end of the first surface 17A and is continuous with the respective rear ends of the fender portions 35a on the left and right and the front hood 36, and the third surface 17C that extends diagonally forward and downward from the lower end of the first surface 17A and is continuous with an upper end of the front-floor cover 68 that is raised upward from the front floor 51 positioned at the feet of the passengers. The cross frame 71 extends in the vehicle-width direction forward of the first surface 17A of the instrument panel 17 and respectively supports the left and right end portions of the instrument panel 17, the steering column 91, and the vehicle-width direction side portions 35m at the lower rear end of the front-side housing 35c. The front-side housing 35c includes at the upper rear end the flanges 35f that are supported by the instrument panel 17. The rear of the front-side housing portion 35c and the upper end of the front-floor cover 68 are spanned by the member 81, and the member 81 is a separate component from the front-side housing 35c and the front-floor cover 68.

According to this configuration, the gap provided between the front-side housing 35c and the first partition makes it easier to assemble the vehicle as there is more space for running wires and connecting other components on the instrument panel 17 with items located in both in the under-hood space 75 and the under-housing space 76. Advantageously, the under-hood space 75 above the front-side housing 35c and the instrument panel space 77 in the instrument panel 17 can subsequently be partitioned from the under-housing space 76 below the front-side housing portion 35c by spanning the gap with the member 81 to inhibit the hot radiator exhaust air from being taken up and water, mud, and the like from being splashed up through the gap and into the under-hood space 75. As the member 81 is a separate component from the front-side housing 35c and the front-floor cover 68, the member 81 can be assembled at a more convenient time later in the vehicle manufacturing process.

Furthermore, as illustrated in FIG. 5, the radiator 73 is disposed in the vehicle front end portion, and the front end of the front-side housing 35c is extended to an upper side of the radiator 73. Therefore, the exhaust air that is passed through the radiator 73 attempts to flow upward but is guided below the front-side housing 35c, below the member 81, and along the front-floor cover 68 to be exhausted below the vehicle body. Therefore, the exhaust air of the radiator 73 can be made less likely to flow above the front-side housing 35c and into the instrument panel 17 and the passenger compartment 12C.

Furthermore, as illustrated in FIGS. 6 and 7, the member 81 may be manufactured by cutting a slab or sheet of an elastic material such as rubber. Therefore, there is no need to mold with a mold or the like, and manufacture is facilitated. The member 81 is positioned adjacent the inner side of the instrument panel 17 in an area that is dense with cables, harnesses, and the like. Therefore, the use of a flexible member 81 allows for the member 81 to be assembled and positioned so as to not interfere with other components that have already been installed in the area and through the gap that the member 81 spans.

Furthermore, as illustrated in FIG. 8, the front-side housing 35c is integrally formed with the fender portions 35a on the left and right, and the member 81 is provided with the width W1 thereof in the vehicle-width direction substantially matching a width W3 of the front-side housing 35c. Therefore, because the fender portions 35a on the left and right are continuous with a front end of the instrument panel 17, the width W1 in the vehicle-width direction of the member 81 is sufficient if substantially matching the width W3 of the front-side housing 35c.

Furthermore, as illustrated in FIGS. 4, 6 and 7, the shift lever 28 penetrates the shift hole 17e, and the auxiliary wall 82 is a rubber plate that is provided in front of the shift hole 17e. Therefore, because excess items inside the instrument panel 17 can be hidden by the auxiliary wall 82, an appearance can be improved. Positioning of the auxiliary wall 82 opposite the shift hole 17e provides an additional barrier from the hot air of the radiator exhaust air, splashing up of water, mud, and the like.

The embodiment described above illustrates but one aspect of the present disclosure, and any modification and application is possible within a scope that does not depart from the spirit of the present disclosure.

The off-road vehicle 10 may be a vehicle of a wheel count other than four, such as a three-wheeled vehicle.

What is claimed is:

1. An off-road vehicle, comprising:
a front-side housing that is positioned between a pair of front fender portions, is covered by a front hood, and houses at least one electrical component;
an instrument panel that is provided with a first surface that is disposed above a front portion of a passenger compartment, a second surface that extends forward and diagonally downward from an upper end of the first surface and is continuous with respective rear ends of the front fender portions on the left and right and the front hood, and a third surface that extends diagonally forward and downward from a lower end of the first surface and is continuous with an upper end of a front-floor cover raised upward from a front floor positioned in the passenger compartment; and
an instrument panel frame that extends in a vehicle-width direction forward of the first surface of the instrument panel and respectively supports left and right end portions of the instrument panel, a steering column, and a rear end of the front-side housing, wherein the front-side housing has at the rear end a support portion supported by the instrument panel, and the rear end of the front-side housing and the upper end of the front-floor cover define a gap that is substantially blocked by a member that is a separate component from the front-side housing and the front-floor cover.

2. The off-road vehicle according to claim 1, wherein a radiator is disposed in a vehicle front end portion and a front end of the front-side housing is extended to an upper side of the radiator.

3. The off-road vehicle according to claim 2, wherein the member is manufactured by cutting out a sheet of an elastic material such as rubber.

4. The off-road vehicle according to claim 3, wherein the front-side housing is integrally formed with the front fender portions on the left and right and the member is provided with a width thereof in the vehicle-width direction substantially matching a width of the front-side housing.

5. The off-road vehicle according to claim 4, wherein a control lever that penetrates a through hole provided in the first surface is provided to the instrument panel and a rubber plate is provided in front of the through hole.

6. The off-road vehicle according to claim 1, wherein the member is manufactured by cutting out a sheet of an elastic material such as rubber.

7. The off-road vehicle according to claim 6, wherein the front-side housing is integrally formed with the front fender portions on the left and right and the member is provided with a width thereof in the vehicle-width direction substantially matching a width of the front-side housing.

8. The off-road vehicle according to claim 7, wherein a control lever that penetrates a through hole provided in the first surface is provided to the instrument panel and a rubber plate is provided in front of the through hole.

9. The off-road vehicle according to claim 1, wherein the front-side housing is integrally formed with the front fender portions on the left and right and the member is provided with a width thereof in the vehicle-width direction substantially matching a width of the front-side housing.

10. The off-road vehicle according to claim 9, wherein a control lever that penetrates a through hole provided in the first surface is provided to the instrument panel and a rubber plate is provided in front of the through hole.

11. The off-road vehicle according to claim 1, wherein a control lever that penetrates a through hole provided in the first surface is provided to the instrument panel and a rubber plate is provided in front of the through hole.

12. An off-road vehicle, comprising:
a passenger compartment;
a front body including a first front fender, a second front fender, a hood, and a radiator positioned beneath the hood, the radiator includes an air intake side facing a front end of the vehicle and an exhaust side facing a rear end of the vehicle;
a first partition that includes an instrument panel, the first partition is positioned between the front body and the passenger compartment;
a second partition that extends from the radiator to the first partition;

a front body compartment that is at least partially defined by an inner surface of the hood, an inner surface of the instrument panel, and an upper surface of the second partition; and at least one electrical component housed in the front body compartment with the second partition positioned between the radiator exhaust side and the electrical component to shield the electrical component from radiator exhaust air.

13. The off-road vehicle of claim 12, wherein the second partition includes a housing that extends from the radiator rearward towards the first partition to define a gap therebetween and a flexible member that spans the gap between the housing and the first partition and is secured to the first partition.

14. The off-road vehicle according to claim 13, further comprising a frame positioned in the front body that extends in a vehicle-width direction, wherein the passenger compartment includes a floor and a floor cover and the first partition further comprises a portion of the floor cover that extends from the floor to the instrument panel, wherein the housing extends from adjacent the top of the radiator rearward to the frame and the member extends rearward from the frame and is secured to the portion of the floor cover that forms part of the first partition, and wherein the second partition and the first partition direct radiator exhaust air rearward from the radiator and underneath the vehicle.

15. The off-road vehicle according to claim 14, wherein the housing is integrally formed with the front fenders and is suspended from the front fenders with a first side wall extending upward from the housing to an inner edge of the first front fender and a second side wall extending upward from the housing to an inner edge of the second front fender, wherein the first side wall and the second side wall partially define the first compartment therebetween, and the flexible member is provided with a width in the vehicle width direction substantially matching a width of the housing between the first wall and the second wall.

16. The off-road vehicle of claim 15, wherein the top of the radiator is accessible from the first compartment, and one of the at least one electrical component is a battery that is positioned in a concave part of the housing on the first side of the second partition with a rearward end of the battery raised with respect to a forward end of the battery to position an upper surface of the battery substantially parallel to the hood.

17. An off-road vehicle, comprising:
a passenger compartment;
a front body including a pair of front fenders, a hood, and a radiator positioned beneath the hood, the radiator includes an air intake side facing a front end of the vehicle and an exhaust side facing a rear end of the vehicle;
a first partition including an instrument panel, the first partition is positioned between the front body and the passenger compartment, the instrument panel includes a control panel that includes one or more through holes; and a front body compartment that is at least partially defined by the hood, an inner surface of the control panel, and an upper surface of a second partition, the one or more through holes provides access to the front body compartment from the passenger compartment, wherein the second partition includes a housing that extends from the radiator toward the first partition and defines a gap therebetween and a flexible member that spans the gap and is secured to the first partition, wherein the second partition is positioned between the exhaust side of the radiator and the one or more through holes in the control panel to direct exhaust air exiting the exhaust side of the radiator away from the one or more through holes in the control panel.

18. The off-road vehicle of claim 17, further comprising a frame that includes an upper body that extends in a vehicle-width direction and a lower body that is positioned below the upper body and extends in a vehicle-width direction, wherein the passenger compartment includes a floor and a floor cover, wherein the instrument panel includes a first leg that is partially covered by the hood and extends forward and downward from an upper end of the control panel and is supported by the upper body, and a second leg that extends forward and downward from a lower end of the control panel to a portion of the floor cover that extends upward from the floor and forms part of the first partition, wherein a rearward end of the housing includes an upper portion secured to the first leg of the instrument panel and a lower portion secured to the lower body of the frame, wherein the flexible member extends rearward from the lower body of the frame and is secured to the portion of the floor cover that extends from the floor to the second leg of the instrument panel.

19. The off-road vehicle according to claim 18, wherein a control lever extends from the passenger compartment through one of the one or more through holes and into the first compartment, wherein a flexible wall is positioned in the first compartment between the first and second legs of the instrument panel, and wherein the flexible wall is positioned between the second partition and the through hole that receives the control lever therethrough, wherein the flexible wall includes a first end secured to the instrument panel and a second end secured to the instrument panel to form a concave shape facing the throughole, and wherein the flexible wall includes a through hole and the control lever extends through the through hole of the flexible wall.

20. The off-road vehicle according to claim 19, wherein the top of the radiator is accessible from the first compartment and a battery is positioned in a concave part of the housing on the first side of the second partition with a rearward end of the battery raised with respect to a forward end of the battery to position an upper surface of the battery substantially parallel to the hood, wherein the housing is positioned between the radiator exhaust side and the battery to shield the battery from radiator exhaust air and the second partition and the first partition direct the radiator exhaust air rearward from the radiator and underneath the vehicle.

* * * * *